Aug. 5, 1924.
C. B. TSAGRIS
1,503,727
ROUTE INDICATOR FOR VEHICLES
Filed Aug. 6, 1921
4 Sheets-Sheet 3
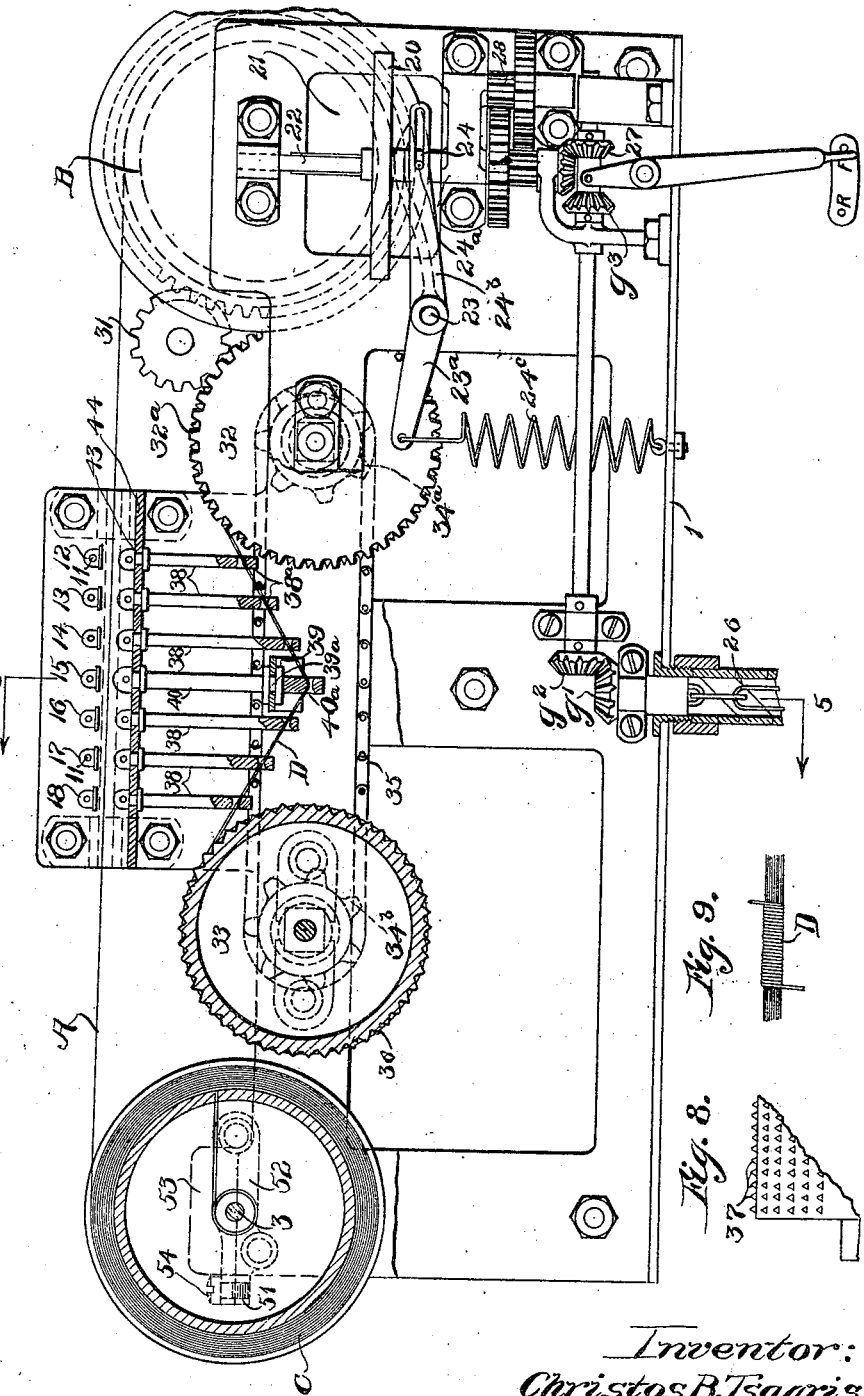
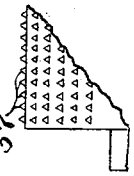
*Inventor:*
*Christos B. Tsagris.*
*by Roberts, Roberts & Cushman*
*his attys.*

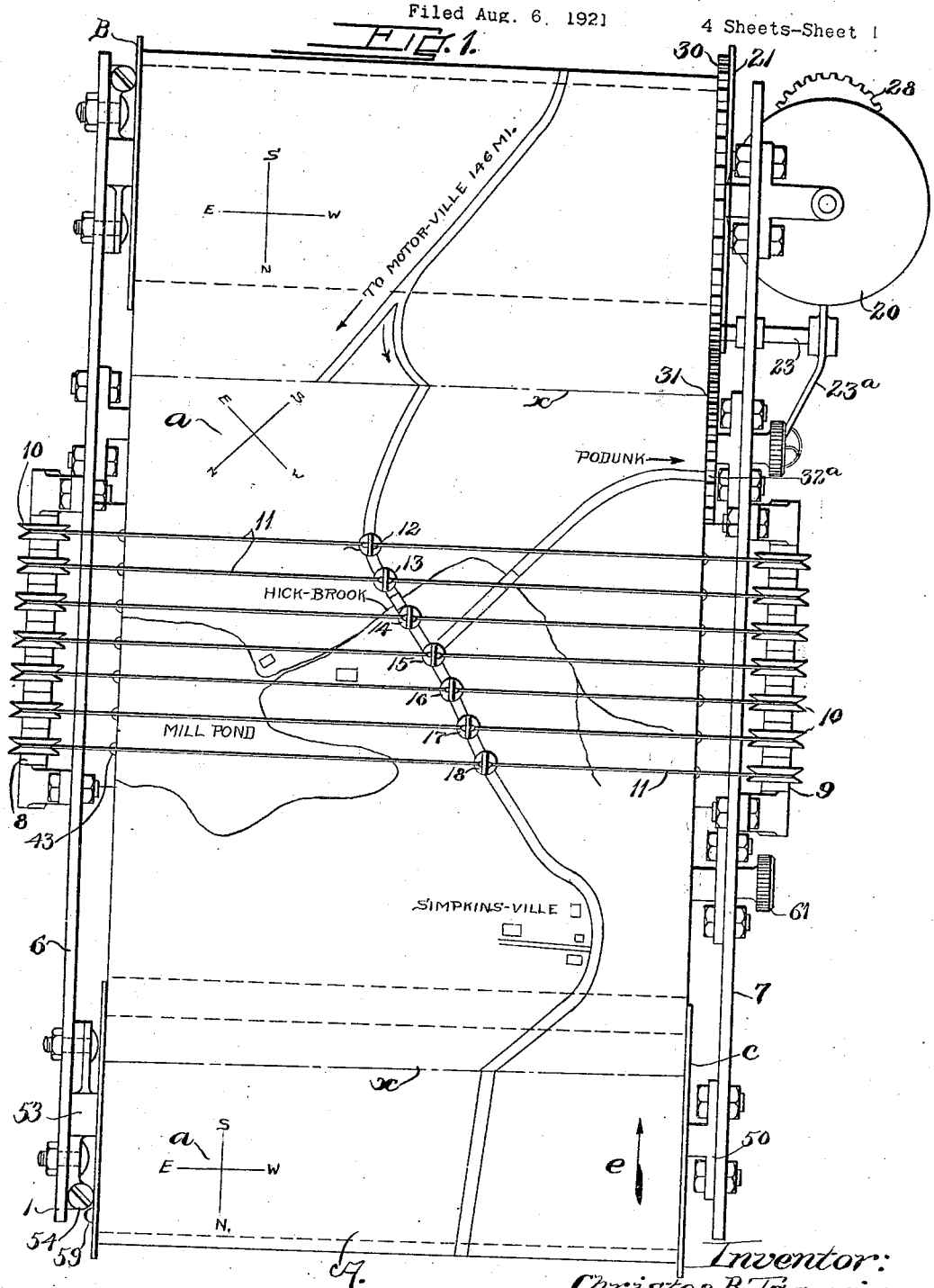

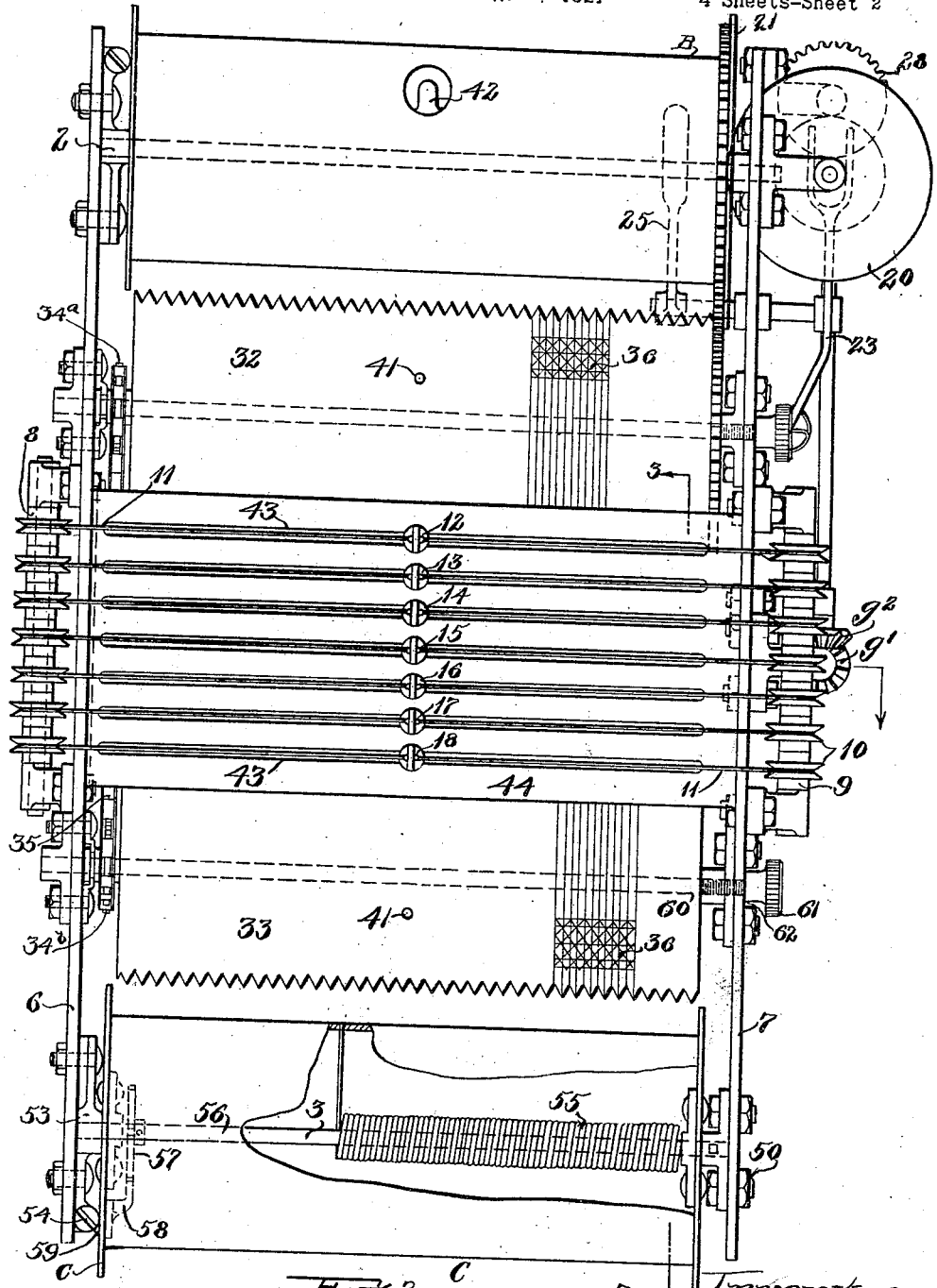

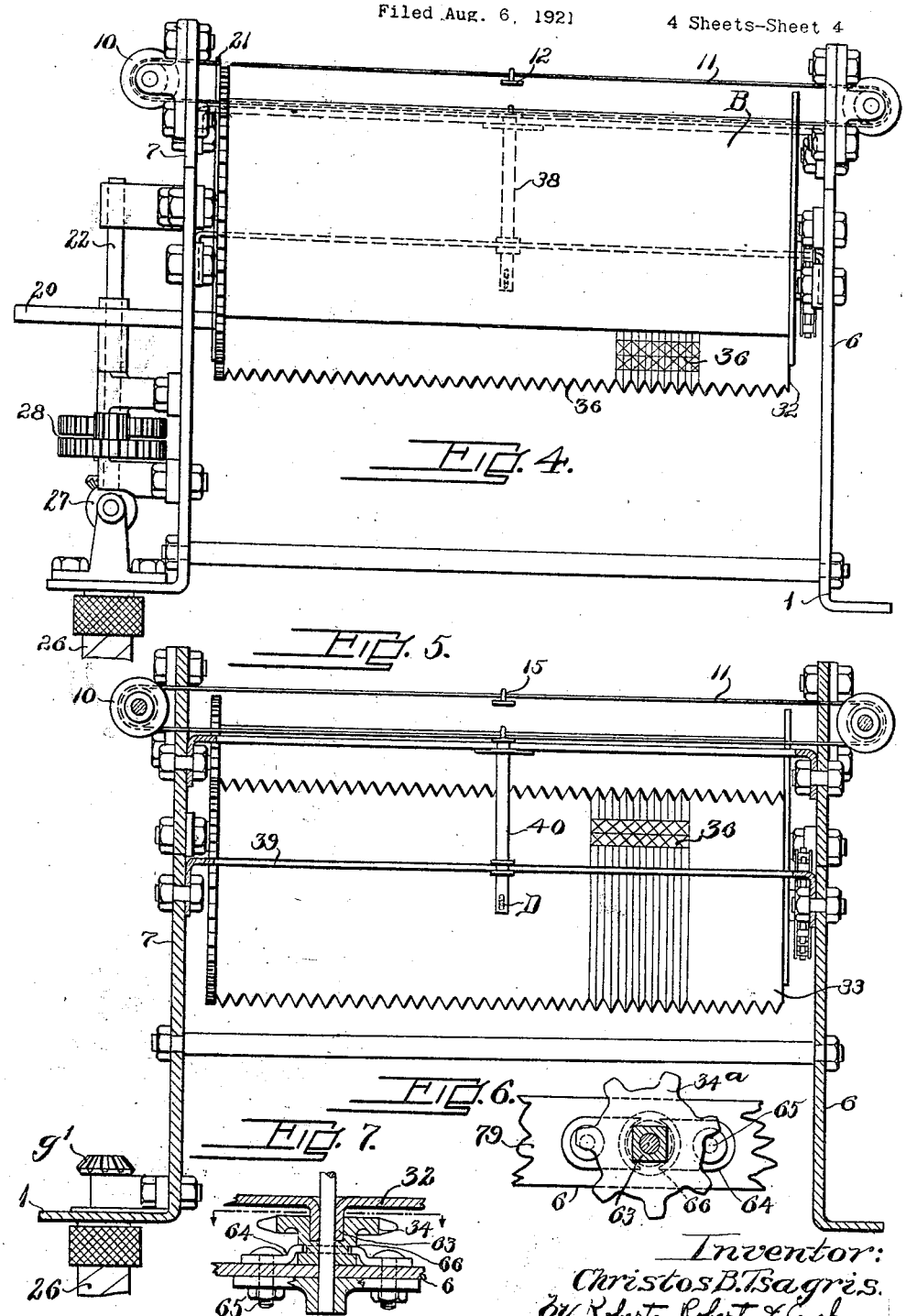

Patented Aug. 5, 1924.

1,503,727

UNITED STATES PATENT OFFICE.

CHRISTOS B. TSAGRIS, OF BOSTON, MASSACHUSETTS.

ROUTE INDICATOR FOR VEHICLES.

Application filed August 6, 1921. Serial No. 490,196.

*To all whom it may concern:*

Be it known that I, CHRISTOS B. TSAGRIS, citizen of the United States of America, and resident of Boston, in the county of Suffolk and State of Massachusetts, have invented new and useful Improvements in a Route Indicator for Vehicles, of which the following is a specification.

This invention relates to route indicators for vehicles.

It has been proposed heretofore by the use of various devices to move a chart of elongate form at a speed proportionate to that of the vehicle past an opening near the driver of the vehicle and as convenient as possible to his line of vision, upon which chart brief directions were printed as to the deviations in the route, or to unroll a map according to the rate of the vehicle. Such devices are not wholly satisfactory, in any instance of which I am aware, because it is difficult to read a map or printed directions without giving constant attention to it, which the driver of a land vehicle, or steersman of a ship, cannot do and at the same time direct his vehicle safely. Through momentary distraction, an important direction may slip by unnoticed. When such a thing happens it may be a considerable time before the steersman becomes aware of his mistake on account of the paucity of information upon his route chart and the narrow length of it which can be exposed at any one time.

Objects of the present invention are to provide automatic instrumentalities adapted clearly to indicate at all times the direction and occasion for turning out of the course or highway; to indicate the exact position reached on the route being followed; to point out in advance all deviations of the route and the choice of branching ways without requiring the driver to read verbal directions; to show in such detail the topographical and other identifying features of the places traversed that the driver who has mistaken or already deviated from the route will promptly be made aware of the fact and to make the traversing of unfamiliar routes easier, quicker, more comfortable, and more enjoyable because more certainly directed by the appliances of this invention.

In its more specific aspects the invention may comprise a device having a conveniently visible index or plurality of indices adapted to be so positioned on the display face or sight opening of the instrument as to point out well in advance the route to be taken and the relative present place of the vehicle so that a glance towards the indicator informs the steersman of the direction of the route and, if desired, of the geography of the region as indicated on a moving chart coordinated with the other indices of the instrument. Since it is unnecessary to read any verbal directions, the instrument does not require constant watching, or distract the driver's attention from driving.

For a clearer understanding of the invention, one embodiment is described in detail and illustrated in the accompanying drawings, in which:

Fig. 1 is a plan view of the display face of the device, the protective casing usually employed being omitted;

Fig. 2 is a view similar to Fig. 1 with the chart removed, and one of the chart rollers cut away to show interior devices;

Fig. 3 is a side elevation one of the frame members being removed and certain of the parts being shown in longitudinal section on line 3—3 of Fig. 2;

Fig. 4 is an end elevation;

Fig. 5 is a section on the line 5—5 of Fig. 3;

Fig. 6 is a detail elevation of the driving connection for one of the indicator actuator devices;

Fig. 7 is a horizontal sectional view of the parts shown in Fig. 6.

Fig. 8 shows a modified form of drum; and

Fig. 9 is a greatly enlarged detail elevation of a preferred type of actuator cable.

The particular embodiment of the invention chosen for the purpose of illustration comprises a frame 1 adapted to be mounted, for example, on the dashboard of a motor car, with the face of the device therein shown turned toward the observer.

A chart strip A mounted upon rollers B and C is adapted to be moved across the face of the device at a speed proportionate to and variable with the speed of the vehicle. This chart may be a map showing in detail the section of the country which the route traverses. The chosen route appears on this chart in a generally longitudinal direction, the charts being in conjoined sections in which the direction of the strip with respect to the points of compass on the map is changed at sufficient intervals to maintain the mapped route in relatively narrow angles to the axis, such intervals being indicated by lines $x$. Preferably each section contains a compass index $a$.

The frame comprises side members 6 and 7 in which the axes 2 and 3 for rollers B and C respectively are removably held.

Referring now to Fig. 3, the rolls B and C are preferably hollow cylinders having bearings in their heads for the axes 2 and 3. Roller B is the winding and roller C the unwinding member of this winding couple, when the chart A is moving across the face of the device in direction of arrow $e$. Means for turning the rollers may comprise a friction driver 20 working on a disk head 21 attached to the roller B which alternately may act as a let-off device for its roller, or as a winding drive, and an opposed spring motor for roller C. Driver 20 is splined on a vertical shaft 22, for motion radially of the roller B induced by the loose collar 24 having pins $24^a$ taking into slots in a fork $24^b$ fast in a rock-shaft 23, having an arm $23^a$ and an arm 25 held by spring $24^c$ between arm $23^a$ and the frame to bear upon the winding chart so that the point of contact between driver 20 and disk 21 is always at the same radial distance from the axis 2 as the winding or unwinding chart, whatever the wound thickness of the chart on roller B may be.

The primary drive from the wheels of the vehicle is by flexible shaft 26 driving the friction driver 20 through a gear train $g'$, $g^2$, $g^3$ preferably including reversing mechanism 27 and reduction gearing 28 of any desired type. The roll B carries a gear 30 meshing with an idler pinion 31 in turn driving a gear $32^a$ on a drum 32 presently mentioned, to which is attached a sprocket $34^a$ driving a similar sprocket $34^b$ on a similar drum 33 through chain 35.

The drums 32, 33 are thus driven at a surface speed proportional to the motion of the vehicle and of the chart A, and are thus adapted to serve as carriers for a linear flexible actuator D for index-elements adapted to be laterally positioned according to the lateral position of the run of actuator D between the turns of the windings on drums 32, 33 of the flexible actuator. Actuator D is at least as long as the charted route, and is distributed in wound turns on the devices in accordance with the deviations of the route. The position of the actuator D is read by indicator slides mounted transversely in accordance with the position of the actuator D.

The drums 32, 33 have surface projections for holding the actuator D in its intended position. For example, annular grooves thereon are cut by transverse grooves leaving the surfaces covered with pyramidal projections 36. An alternate form of drum is shown in Fig. 8 in which the surface is provided with rows of projecting pins 37, but merely roughening the surface of the drums may be sufficient when only a short length of flexible member D is to be used as for short routes.

The flexible actuator member D may be a fine wire, cord, or catgut, but preferably is a so-called pearl-stringer's strand consisting of silk strands wrapped with fine flexible wire the structure of which is shown on a greatly enlarged scale in Fig. 9.

Projecting laterally from the sides 6 and 7 are brackets supporting shafts 8 and 9 upon which are rotatably mounted pulleys 10. Threaded around each pair of pulleys is an endless wire or string 11 with one run disposed above the map and the other below it. Attached to the upper runs of the wire 11 are indicators or indices 12, 13, 14, 15, 16, 17 and 18. These indicators are arranged to be moved laterally of the map to indicate the direction to be taken by the vehicle. The central indicator 15 is preferably of a different form or color from the others, and shows at all times the exact position of the vehicle on the route. Indicators 16, 17 and 18 are arranged to indicate in advance deviations that the vehicle must make in order to follow the route when the map is moving upwardly as shown in Fig. 1. When the map is caused to move downwardly by the reversing gears $g^3$, 27, Fig. 3, as on the return journey or when the map is reversed, indicators 12, 13 and 14 then point out in advance the deviations to be made.

The connection between the indicators 12—18 and the flexible member D whereby the former are moved from time to time by the latter to show the deviations of the route may comprise followers 38 and 40 corresponding in number to the indicators and slidably disposed in guide grooves 43 in a transverse plate 44 which connects side members 6 and 7 of the frame immediately below the lower runs of the endless wires 11. Each of the followers 38 and 40 has its upper end attached to the corresponding wire 11 and has a hole $38^a$ or $40^a$ in its opposite end through which the flexible actuator D passes. The central follower 40 corresponding to central indicator 15 is larger in diameter and longer than followers 38 and is additionally supported and guided by sliding contact in guide groove $39^a$ of transverse plate 39 in spaced parallel relation to plate 44. The greater length of follower 40 positions guide hole $40^a$ for the actuator D substantially in the plane of the axes of drums 32 and 33, the followers 38 on either side progressively being shorter (Fig. 3) so that their guide holes 38ª dispose actuator D in straight lengths from guide hole 40ª to the peripheries of the drums 32 and 33. The followers and the endless wires 11 connected thereto for actuating the indicators move very easily and practically the only frictional resistance produced as the actuator D passes through the guide holes is that encountered in guide hole 40ª. The flexible actuator is depressed between drums 32 and 33 by follower 40 to insure the accurate transfer of the inclined windings from one drum to the other so that when the device is reversed the deviations of the return route will be properly indicated.

The followers through their connection with the flexible member D are moved from side to side in the slots, and thus operate the endless members 11 and so move indicators 12—18 across the face of the map to indicate the course of the route to be followed.

Suitable pins 41 are provided on both drums 32 and 33 for attaching the end of the flexible actuator D and in a similar manner suitable hooks 42, similar to those on player piano rolls, are provided on the map rollers B and C.

In order that the different routes may be shown, suitable provision should be made for the removal of the map rollers and wire drums. One arrangement for this is shown in Figs. 2 and 3 in which map roller C is provided with the usual type of bearing 50 on one side, and a split bearing 51 on the other which comprises a lower fixed member 52 and an upper hinged member 53 held in operative position by screw 54. By loosening the screw 54 and raising the hinged member 53 the roller with the map mounted thereon can be readily removed. Since the driving mechanism for the map is connected with roller B only, provision may be made for take-up when the drive is reversed by providing roller C with a torsional spring 55 such as is used in shade rollers. In order that a shorter spring may be used, a reduction gearing may be provided, if desired. When roller C is to be taken from the device, it is necessary to hold this torsional spring against rotating the shaft of the roller relative to the roller itself. This is done by providing the shaft 3 with a slotted disc 57 and the end of the roller C with a slidable catch 58 operated by a button 59 from the outer end.

The wire drum 33 is loosely mounted upon a removable shaft 60 held in position by screw threads on end 61 coacting with a screw thread in the support opening 62 in the frame member 7. The end of the drum 33 has a square extension 63 fitting into a squared recess in the sprocket wheel 34 held in position against the side of frame member 6 by lugs 64 attached to the frame by bolts 65, the tips of the lugs entering an annular slot 66 in the sprocket wheel. By removing shaft 60 the drum 32 can be readily removed.

The operation of the device is as follows: A roller C with a chart thereon and a drum 33 having a flexible actuator wound thereon to correspond with the deviations of the route to be followed on the chart (of course in a reverse sense, deviations to the left of the road being indicated by deviations to the right of the actuator) are inserted in the frame 1. The flexible actuator is threaded through holes 38ª and 40ª in the followers 38, 40 and is attached to pin 41 on drum 32. In a similar manner the map A is threaded between the upper and lower runs of the endless members 11 and attached to hook 42 on the winding roll B. The vehicle is then ready to start. The driving connection 26 from the wheels or shaft turns the rollers and drums at a speed proportionate to and variable with the speed of the vehicle. As the flexible actuator D is unreeled from drum 33 and wound upon drum 32, the changes of inclination of the wire are shown above the map by the indicators 12—18 which are shifted by the movement of the followers as the wire runs through the holes therein transversely so that the driver is shown in advance the turns to be made and central indicator 15 marks at all times the exact position of the vehicle upon the route. When a new map is to be inserted, the reversing lever is placed in neutral position thus disconnecting the driving mechanism whereupon spring 55 will rewind both the map and the wire upon roller C and drum 33, respectively. In using my invention the chart is not essential and can be omitted since the route may be followed by making the turns as they are shown by the indicators 12—18. The indicators may likewise be omitted also and plate 44 cut away so that the route can be followed by watching the flexible actuator D itself. In this case the flexible actuator will be laid, not inversely, but directly, in accordance with the deviations of the road. The chart however is valuable in that it permits the branch roads and topographical features of the section to be shown.

There are various methods for winding the flexible actuator D upon the drums used in my invention but at present the preferred method is to wind a chart and a flexible member simultaneously upon a map roller and a drum respectively, the flexible member being threaded through followers 38 and 40, and to positively move follower 40 transversely back and forth so as to keep the index or marker 15 corresponding thereto always directly above the route to be followed. For the winding operation it is more convenient to use a machine separately mounted for that purpose than to use one of the machines installed upon a vehicle.

It is to be understood that prior to the winding of the flexible actuator D the strip chart or map must be prepared, carefully drawn to scale so that when in use in the route indicator there will be no discrepancy between the actual position of the vehicle and its position as shown by the indicator. After the flexible actuator D has been wound as described, upon a drum in conformity with the deviation of the route on a strip chart, the wound drum may be used in my route indicator in conjunction with the chart or without it as desired.

By mounting a stylus in place of marker 15 the route can be traced upon a blank strip of paper if a roll of the latter is substituted for a map by using therewith a drum properly wound with actuator wire D in conformity with the deviations of the desired route.

I claim:

1. A route indicator having a rotatable support, a flexible member wound thereon in an irregular manner in conformity with the deviations of the route and means for unwinding the flexible member whereby the direction of the route is indicated by the inclination of the flexible member when unwinding.

2. A route indicator for vehicles having spaced rotatable supports, a flexible member wound upon one of said supports in an irregular manner in conformity with the deviations of the route, means for unwinding said member from the one support and winding it upon the other at a speed proportional to the speed of the vehicle, whereby the direction of the route is indicated by the inclination of said flexible member.

3. A route indicator having a rotatable support, a flexible member, and means for winding said member upon said support so that the inclination of said flexible member indicates the direction of the route when said member is unwound.

4. A route indicator having spaced drums with roughened surfaces, a flexible member wound upon one drum in a zig-zag manner to conform to the deviations of the route, and means for unwinding the flexible member from one drum and winding it upon the other whereby the inclinations of the winding of the flexible member upon the first drum is transferred directly to the second drum.

5. A route indicator for vehicles having means for indicating the direction of the route comprising a flexible member movable continuously in the same direction while the vehicle is in motion but capable of lateral deviations in accordance with a predetermined arrangement of said member relating to the route, said deviations indicating changes in direction of the route.

6. A route indicator for vehicles having a plurality of indices, one of which represents the vehicle and the others the direction of the route in advance of the vehicle, and a driving connection responsive to motion of the vehicle for moving said indices.

7. A route indicator for vehicles having a plurality of indices, one of which represents the vehicle and the others the direction of the route behind the vehicle, and means including a flexible member and a driving connection responsive to motion of the vehicle for moving said indices.

8. A route indicator for vehicles having a plurality of indices, one of which represents the vehicle and the others the direction of the route in advance of and behind the vehicle, and means including a flexible member and a driving connection responsive to motion of the vehicle for moving said indices.

9. A route indicator having a movable chart, means for moving the chart and means responsive to motion of the vehicle for positively indicating in relation to the chart the route to be followed as the chart is moved.

10. A route indicator having a chart movable in forward and reverse directions and means independent of the chart for positively indicating in advance in relation to the chart the route to be followed when the chart is moved in either direction.

11. A route indicator having a movable chart and means independent of the chart including an elongate, flexible member for positively indicating in relation to the chart the route to be followed.

12. A route indicator having a movable chart, a plurality of indicators above the chart and movable transversely thereof to point out in advance the route to be followed, and means controlled by the motion of the vehicle for moving the indicators.

13. A route indicator having a movable chart, a plurality of indicators above the chart and movable transversely thereof to point out the route to be followed as the vehicle progresses, and means for moving the indicators including an elongate flexible member.

14. A route indicator having a movable chart, an endless member encircling said chart, an indicator thereon, and means for moving the endless member and thereby the indicator to point out the route to be followed.

15. A route indicator having a chart means for moving said chart longitudinally, an indicator above said chart, means for moving the indicator transversely relative to the chart comprising a follower and a flexible member to actuate said follower.

16. A route indicator having an elongate chart, means for moving the same longitudinally, indicators independent of the chart, and means for shifting the latter transversely of the chart comprising a flexible member moved coordinately with the chart.

17. A route indicator having an elongate chart, a flexible member in spaced relation to the chart, means for moving both the chart and the flexible member coordinately, and means associated with said member for indicating on said chart the route to be followed.

18. A route indicator having an elongate chart, rotatable means for moving the chart longitudinally, a flexible member in spaced relation to the chart, and means for moving the flexible member coordinately with the chart comprising spaced drums, having projections on their annular surfaces over which the flexible member is wound in a zig-zag direction in conformity with the lateral deviations of the route to be followed.

19. A route indicator having an elongate chart, rotatable means for moving the chart longitudinally, a flexible member in spaced relation to the chart, means for moving the flexible member coordinately with the chart comprising spaced drums, having projections on their annular surfaces over which the flexible member is wound in a zig-zag direction in conformity with the lateral deviations of the route to be followed, and indicators adjacent said chart and moved transversely thereof by said flexible member to indicate the route to be followed.

20. A route indicator having a chart arranged to be moved in a longitudinal direction, a plurality of indicators adapted for movement transversely of said chart to indicate the deviations of said route, one of said indicators marking at all times the position of the vehicle whereby the indicators in advance of the marker will indicate a turn in advance of the time for making the turn.

21. A route indicator having a chart, means for indicating at all times in relation to the chart the exact position of the vehicle, additional means for indicating the turns to be made before the vehicle reaches the points at which the turns are to be made, and a driving mechanism for moving said chart and both said means coordinately.

22. A route indicator having an elongate chart, two rollers therefor, means for winding the chart upon one roller and unwinding it from the other, a flexible member, two drums therefor, means coordinate with said means for winding the flexible member upon one drum and unwinding it from the other in such a way as to indicate the deviations of the route shown upon the chart.

23. A route indicator having a map showing in detail the country traversed, movable means adjacent the map for indicating the route to be followed, and mechanism controlled by the motion of the vehicle for automatically moving both said map and said means coordinately.

24. A route indicator having a map showing in detail the country traversed, means for moving the map as the vehicle progresses, and movable means adjacent the map and controlled by the motion of the vehicle, for indicating the route to be followed, said movable means being adapted to indicate the route back to the starting point when the map is moved in the reverse direction.

25. In a device of the class described, a roller having a chart wound thereon, a drum having a flexible member wound thereon in such a way as to indicate relative to the chart the deviations of the route to be followed, and means for coordinately unwinding the chart and the flexible member from the roller and the drum respectively.

26. A route indicator for vehicles comprising a member having a portion adapted to be orientated to the desired direction of travel, and means controlled by the motion of the vehicle automatically to orientate said portion to said direction.

27. A route indicator for vehicles comprising a plurality of supports, an elongate member extending between said supports, and means controlled by the motion of the vehicle automatically to orientate said member relatively to said supports.

28. A route indicator for vehicles comprising a movable chart, a movable indicator associated with the chart, and means controlled by the motion of the vehicle, for moving said indicator relative to said chart.

29. A route indicator for vehicles comprising a movable chart, a movable indicator associated with the chart, automatic means controlled by the motion of the vehicle for moving the chart proportionately and for orientating the indicator in proportion to the deviation of the route.

30. A route indicator comprising a chart, an indicator associated with the chart, and automatic means controlled by the motion of the vehicle for both orientating and moving the indicator relatively to the chart.

Signed by me at Boston, Mass., this twenty-eighth day of July, 1921.

CHRISTOS B. TSAGRIS.